(12) United States Patent
Jones et al.

(10) Patent No.: US 10,081,217 B2
(45) Date of Patent: Sep. 25, 2018

(54) VEHICLE WHEELS

(71) Applicant: Jaguar Land Rover Limited, Coventry (GB)

(72) Inventors: Anthony Jones, Coventry (GB); Mark Collins, Coventry (GB); Andrew Chatwin, Coventry (GB); Hugo Nightingale, Coventry (GB); John Pitman, Coventry (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 104 days.

(21) Appl. No.: 14/650,742

(22) PCT Filed: Dec. 10, 2013

(86) PCT No.: PCT/EP2013/076133
§ 371 (c)(1),
(2) Date: Jun. 9, 2015

(87) PCT Pub. No.: WO2014/090827
PCT Pub. Date: Jun. 19, 2014

(65) Prior Publication Data
US 2016/0046145 A1    Feb. 18, 2016

(30) Foreign Application Priority Data

Dec. 10, 2012    (GB) .................................. 1222174.3

(51) Int. Cl.
*B60B 7/00* (2006.01)
*B60B 7/18* (2006.01)
(Continued)

(52) U.S. Cl.
CPC ................. *B60B 7/18* (2013.01); *B60B 3/10* (2013.01); *B60B 7/00* (2013.01); *B60B 7/008* (2013.01);
(Continued)

(58) Field of Classification Search
CPC ..... B60B 7/008; B60B 7/0086; B60B 7/0066; B60B 7/00; B60B 7/06; B60B 7/066; B60B 7/04; B60B 7/0026; B60B 3/10
(Continued)

(56) References Cited

U.S. PATENT DOCUMENTS 6,193,322 B1    2/2001    Corridori
6,517,168 B1    2/2003    Van Houten
(Continued)

FOREIGN PATENT DOCUMENTS

CN    1223613 A    7/1999
DE    201 22 871 U1    12/2008
(Continued)

OTHER PUBLICATIONS

Notification of the First Office Action, Chinese Patent Application No. 201380064011.X, dated May 4, 2016, 22 pages.

*Primary Examiner* — Jason R Bellinger
*Assistant Examiner* — Scott A Browne
(74) *Attorney, Agent, or Firm* — Myers Bigel, P.A.

(57) ABSTRACT

An insert for a vehicle wheel having a plurality of spokes which define, in part, an outwardly-facing wheel surface, and further define between adjacent ones of the spokes, a cavity for receiving the insert, in use, the insert comprising: an outer profile of complementary shape to the cavity and arranged to fit securely within the cavity, in use; and a flow redirecting surface which is aerodynamically shaped so as to reduce drag on an adjacent spoke of the wheel, in use.

16 Claims, 2 Drawing Sheets

(51) Int. Cl.
*B60B 7/06* (2006.01)
*B60B 3/10* (2006.01)
*B60B 7/04* (2006.01)

(52) U.S. Cl.
CPC .......... *B60B 7/0026* (2013.01); *B60B 7/0066* (2013.01); *B60B 7/0086* (2013.01); *B60B 7/04* (2013.01); *B60B 7/06* (2013.01); *B60B 7/065* (2013.01); *B60B 2900/1216* (2013.01); *B60Y 2200/11* (2013.01); *Y02T 10/88* (2013.01)

(58) Field of Classification Search
USPC ..... 301/37.101, 37.102, 37.31, 37.11, 37.34, 301/37.41, 37.42
See application file for complete search history.

(56) References Cited

U.S. PATENT DOCUMENTS

| | | | | |
|---|---|---|---|---|
| 8,382,211 B2* | 2/2013 | Renius | ................... | B60B 7/065 301/37.102 |
| 9,452,637 B2* | 9/2016 | Mengle | ................... | B60B 7/04 |
| 2004/0195907 A1 | 10/2004 | Keehler et al. | | |
| 2006/0043782 A1 | 3/2006 | Houten | | |
| 2010/0181821 A1* | 7/2010 | Noriega | ................ | B60B 7/0013 301/5.1 |
| 2012/0080932 A1* | 4/2012 | Ilse | ....................... | B60B 7/0086 301/6.3 |

FOREIGN PATENT DOCUMENTS

| | | |
|---|---|---|
| DE | 20 2009 008 508 U1 | 8/2009 |
| DE | 20 2009 013 418 U1 | 3/2011 |
| DE | 10 2010 046 882 A1 | 3/2012 |
| DE | 10 2011 104 253 A1 | 3/2012 |
| DE | 10 2011 114 664 A1 | 4/2012 |
| DE | 10 2013 004 286 A1 | 9/2013 |
| DE | 102012208081 A1 * 11/2013 ............... B60B 1/06 |
| EP | 1 319 526 A2 | 6/2003 |
| FR | 2 998 507 A1 | 5/2014 |
| GB | 2508664 A1 | 6/2014 |
| WO | WO 98/57812 A1 | 12/1998 |

* cited by examiner

VEHICLE WHEELS

RELATED APPLICATIONS

This application is a 35 U.S.C. § 371 national stage application of PCT Application No. PCT/EP2013/076133, filed on Dec. 10, 2013, which claims priority from Great Britain Patent Application No. 1222174.3, filed on Dec. 10, 2012, the contents of which are incorporated herein by reference in their entireties. The above-referenced PCT International Application was published in the English language as International Publication No. WO 2014/090827 A1 on Jun. 19, 2014.

TECHNICAL FIELD

The invention relates to improvements relating to vehicle wheels, and in particular to reducing the aerodynamic drag caused by the wheels. Aspects of the invention relate to an insert, to a component, to a wheel and to a vehicle.

BACKGROUND

In modern vehicles, and in particular in high performance cars, it is often preferable to fit alloy wheels as they offer many benefits in terms of the performance of the car. Alloy wheels for cars are made from an alloy of aluminium or magnesium, in contrast to standard wheels which are manufactured in steel. They are therefore considerably lighter than standard wheels.

The reduced weight of an alloy wheel carries the benefits of improving both the handling and the ride quality of the car, by lowering the total mass of components that are not supported by the suspension, or unsprung mass. In addition to lowering the unsprung mass of the car, the overall mass of the car is also reduced, which has associated benefits in terms of fuel economy. Finally, alloy wheels are generally considered to be more attractive than standard wheels, and also give the impression of high performance when fitted to a car, as their advantages are well known. It is therefore expected in the case of high performance cars that they should be fitted with alloy wheels. Clearly, when customers are paying a substantial sum of money for a high performance car, it will often be important to them that it is aesthetically pleasing. Therefore any additions or modifications to the alloy wheels will need to be sympathetic to this requirement.

Wheels of this type are generally shaped such that they feature a central hub, which attaches to the wheel axle, with a number of spokes extending from the hub to the outer rim to which the tyre attaches. Large gaps are left between the spokes, in order to reduce the mass of the wheel as much as possible. However, one problem that arises from this is that when the car is travelling at speed, these gaps between the spokes cause the air that is flowing past the wheel to become turbulent, and therefore significantly increase the drag effect of the air on the wheel and therefore the car as a whole. In more detail, the large gaps between the spokes enables the flow of air past the wheel to pass through the wheel easily, rather than maintaining its momentum in the direction parallel to the direction of travel of the vehicle. This means that the fuel economy of the car is compromised as well as the performance. One of the key considerations for modern cars is how efficiently they can run, so clearly there is a motivation to eliminate any source of drag on a car and improve its aerodynamic performance wherever possible. Furthermore, in order to achieve the objective of providing a lightweight wheel in which the amount of material used is minimised but in which the desired structural properties are achieved, the spokes are typically thin (in the radial sense of the wheel) and define a flat face which extends parallel to the axis of rotation of the wheel. Such a flat face results in increased air resistance when the wheel rotates.

It is an objective of the present invention to overcome or substantially mitigate the above mentioned problems.

SUMMARY OF THE INVENTION

Aspects of the invention provide an insert, a component, a wheel and a vehicle as claimed in the appended claims.

According to one aspect of the invention, there is provided an insert for a vehicle wheel having a plurality of spokes which define, between adjacent ones of the spokes, a cavity for receiving the insert, in use, the insert being arranged to be secured in a cavity of the wheel, in use, and the insert comprising a flow redirecting surface which is aerodynamically shaped so as to reduce drag on an adjacent spoke of the wheel, in use.

Embodiments of the invention provide the advantage that the aerodynamic properties of the wheel are improved, but without unduly affecting the visual appearance of the wheel. The inserts may comprise discreet components that fit neatly within the cavities between the spokes to provide an aerodynamic benefit, whilst the wheel retains the visually pleasing appearance provided by the spoke arrangement as is typical with alloy wheels.

The insert may be for a wheel in which the plurality of spokes define, at least in part, an outwardly-facing wheel surface, the outwardly facing surface of each spoke being defined between respective trailing and leading spoke edges, wherein the flow redirecting surface extends from the edge of an adjacent spoke along substantially the entire length thereof.

The adjacent spoke edge may be a leading edge or a trailing edge of the spoke as defined by the direction of rotation of the wheel in use.

The insert may comprise a flow redirecting surface which extends from the leading edge of an adjacent spoke, so as to reduce drag on the leading edge of the spoke, in use.

In one embodiment of the invention, when fitted in the cavity in use, no part of the insert protrudes beyond the outwardly-facing wheel surface.

The flow redirecting surface of the insert may extend inwards towards the vehicle when the insert is fitted in the cavity in use.

The flow redirecting surface of the insert may be substantially flat. The flat surface of the flow redirecting surface may also be flush with the outwardly-facing wheel surface. In this embodiment, air flow is entirely prevented from entering the wheel cavity, and therefore the effect of the cavity on the aerodynamic performance of the vehicle is eliminated.

The flow redirecting surface may be formed into a blade in order to improve the effectiveness of the air redirection, and therefore further reduce the build-up of turbulence and the corresponding drag effect.

The insert may comprise a central opening to allow air flow therethrough for the cooling of the vehicle brakes, and also to minimise any detriment to the visual appearance of the wheel to which the insert is fitted.

The opening of the insert may define a leading edge and a trailing edge, as determined by the direction of rotation of the wheel to which the insert is fitted, whereby, in use, the leading edge and trailing edge have different aerodynamic profiles, such that the insert exhibits handedness. This means that rather than a vehicle requiring a different wheel design for each side of the vehicle, one wheel design can be used with the two insert designs, one for the left side of the vehicle and one for the right side. The two insert designs may, for example, be mirror images of each other. This provides a cost advantage over having to provide two different wheel types, as the inserts are a lower cost item than the wheel.

It is noted that a vehicle may have two different wheel designs; one for the front wheels, and another for the rear wheels. In this instance, it may be necessary to have four different insert designs; one for each wheel. It is further noted that the spokes of the wheels may be symmetrical, in order to allow for the wheel to be used on either side of the vehicle. This enables the different insert designs to have a substantially similar outer profile.

The insert may have an outer profile which is symmetrical about a line extending radially outward from an axis of rotation of the wheel and bisecting the cavity in which the insert is fitted, in use.

The insert may be arranged to fit in the cavity such that there is no gap between the outer profile of the insert and the outwardly-facing wheel surface, meaning that air will not penetrate between the insert and the wheel. This will improve the effectiveness of the insert in terms of the aerodynamic performance.

The insert may be made from plastic in order to keep the cost of manufacture to a minimum.

The insert is preferably readily removable from the wheel, meaning that if it becomes damaged or dirty, it will be easy to replace. For example the insert may be attached to the wheel by means of clips.

The insert may be integrally formed with one or more other inserts to form an integrated component, with each insert fitting into a corresponding cavity of the wheel. In another aspect, therefore, there is provided an overmould component for a vehicle wheel, wherein the component comprises at least one insert according to the first aspect, each of which is for fitment in a different respective cavity defined between different pairs of adjacent spokes of the wheel.

According to a further aspect of the invention, there is provided a vehicle wheel comprising one or more inserts in accordance with the first or second aspects of the invention, wherein each insert is received within a corresponding cavity of the wheel to provide aerodynamic benefits.

According to one aspect of the invention, there is provided an insert for fitment to a wheel of a vehicle which has a plurality of spokes which define an outwardly-facing wheel surface which faces outwards from the vehicle. Between adjacent ones of the spokes, there is defined a cavity for receiving the insert. The insert comprises an outer profile of complementary shape to the cavity and arranged to fit securely within the cavity, in use. The insert further comprises a flow redirecting surface which is aerodynamically shaped so as to reduce drag on the wheel, in use. The flow redirecting surface directs air away from the cavity and thus prevents the build-up of turbulence in and around the cavity, thereby reducing drag.

Within the scope of this application it is expressly intended that the various aspects, embodiments, examples and alternatives set out in the preceding paragraphs, in the claims and/or in the following description and drawings, and in particular the independent features thereof, may be taken independently or in any combination. For example preferred and/or optional features of the one aspect of the invention may be incorporated alone or in appropriate combination in other aspects of the invention also, except where such features are incompatible.

BRIEF DESCRIPTION OF THE DRAWINGS

One or more embodiments of the invention will now be described, by way of example only, with reference to the accompanying drawings, in which.

DETAILED DESCRIPTION

Figure 1:
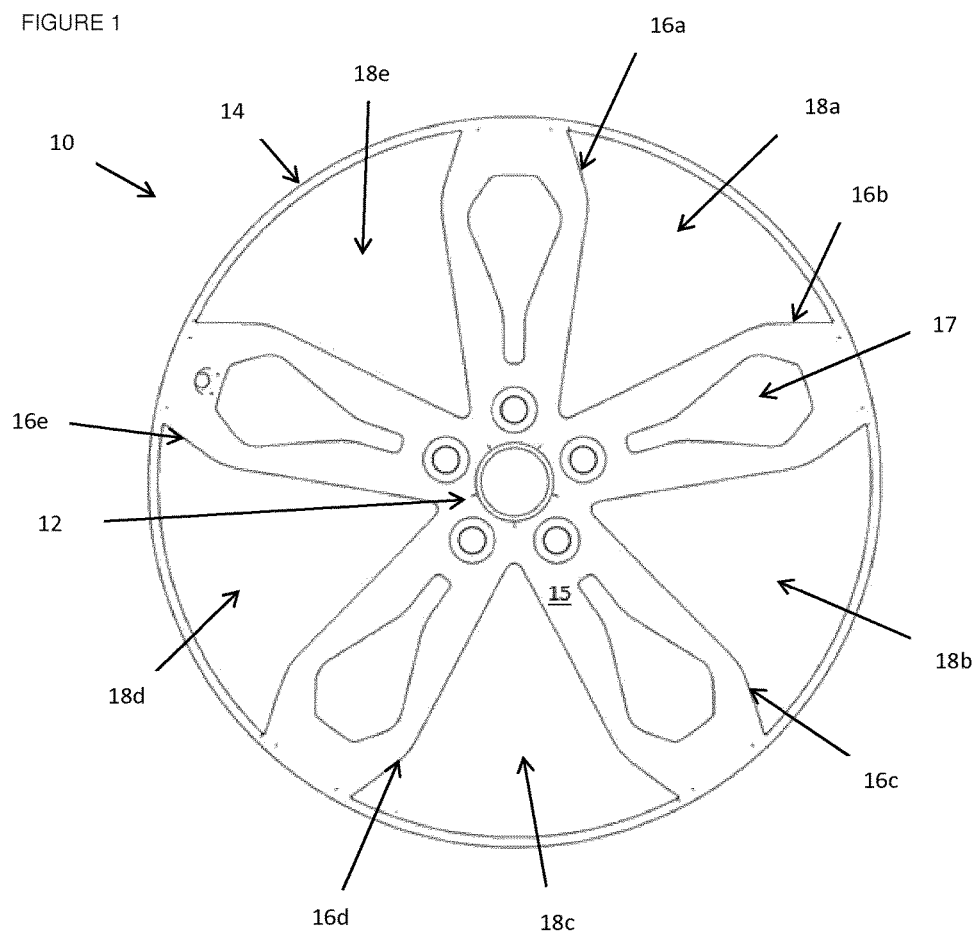
FIG. 1 shows an example of a wheel to which an insert of the invention is to be fitted.

The invention shall be described for the particular case in which the wheel to which the invention is to be fitted is formed with five spokes. It will be appreciated by the skilled person that the invention could easily be adapted to fit to any vehicle wheel with any number of spokes of any shape and size.

Referring to FIGS. 1 to 4, the invention takes the form of an insert which, in one embodiment, is suitable for use with an alloy wheel 10 for a vehicle, the alloy wheel 10 comprising a hub 12, an outer rim 14, and a plurality of spokes 16a-16e extending from the hub 12 to the outer rim 14. The wheel further comprises an outwardly-facing surface 15 defined in part by the outwardly-facing surfaces of the spokes 16a-16e. Each of the spokes 16a-16e is provided with an opening 17 to provide an aesthetically pleasing appearance to the wheel in a known manner.

There are five spokes 16a-16e equi-angularly spaced around the hub 12, with adjacent ones of the spokes 16a-16e defining, together with the outer rim 14 of the wheel, a respective one of five cavities 18a-18e therebetween.

Figure 2:
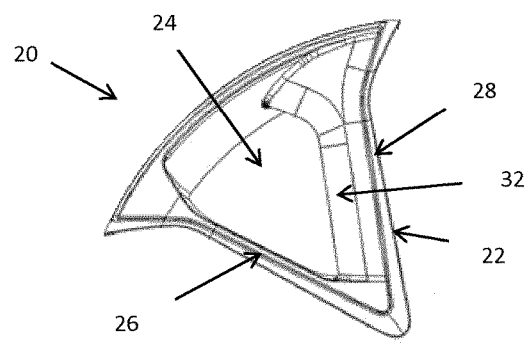
FIG. 2 shows an insert of a first embodiment of the invention for fitment to the wheel of FIG. 1.

With reference to one of the inserts 20 as shown in FIG. 2, the insert 20 is of complementary shape to the cavity 18a within which it fits with the outer profile 22 of the insert 20 being arranged to correspond exactly to the boundary profile of the cavity 18a. In this way the outer profile 22 of the insert 20 is in contact with the outwardly-facing surface 15 of the wheel 10 so that air cannot be drawn between the wheel 10 and the insert 20 as this would significantly reduce the effectiveness of the aerodynamic benefit.

The insert 20 is formed with an opening 24 in the centre. The provision of the opening reduces the visual impact of the insert due to the reduced volume of material, and also allows air to flow through the cavity 18a to cool the brakes located behind the wheel 10. The boundary of the opening 24 defines a leading edge 26 towards the front of the wheel and a trailing edge 28 towards the rear of the wheel, as defined by the direction of rotation 30 of the wheel 10 shown in FIG. 3.

A surface 32 of the insert 20 extending away from the trailing edge 28 of the insert 20 is inclined inwardly into the wheel 10. In this way the surface 32 takes the form of a blade or wing for air diversion. Air flowing past the wheel 10 as the vehicle moves forwards is therefore re-directed away from the cavity 18a and away from the wheel by the blade, thus preventing the air from becoming turbulent in and around the cavity 18a which would increase drag. Some air, however, will flow through the cavity 18a to provide cooling of the brakes.

The insert 20 exhibits handedness so that it will be necessary to have two sets of inserts for each vehicle; one set for the right-hand side of the vehicle, and another for the left-hand side of the vehicle. In order for the blade of the insert 20 to be effective, it is angled such that it faces towards and meets the oncoming air as the vehicle is moving. If two identical inserts 20 were fitted to two separate wheels 10, one on one side of the vehicle and the other on the opposite side of the vehicle, the leading edge 26 and trailing edge 28 would be swapped. For one insert the blade would face the oncoming air, and for the other insert on the other side of the vehicle the blade would face away from it, and would be rendered ineffective. The inserts of the invention provide an advantage over simply reshaping the wheels to perform the same function because, for a given vehicle, it is far cheaper and more efficient to have one wheel design with two corresponding types of insert, than to have two types of wheel.

In the presently described embodiment, the rotational resistance of the wheel 10 is reduced by reducing the aerodynamic drag caused by each spoke 16a-16e as it rotates. In particular, the trailing edge 28 of the insert 20 is shaped so as to conform to the leading edge of the adjacent spoke 16a-16e. With this configuration, the blade projects from the leading edge the spoke 16a-16e along substantially the entire length of the spoke 16a-16e, i.e. between the end of the spoke at the hub 12 and the end at the outer rim 14, respectively. Thus, the tapered shape of the blade on the trailing edge of the insert 20 serves to reduce the pressure build up on the leading edge (i.e. the flat face) of the adjacent spoke 16a-16e thereby reducing so-called stagnation losses and improving aerodynamic efficiency. Furthermore, the blade serves to reduce the size of the 'wheel wake' due to the effective reduction in the spacing between the spokes 16a-16e. That is to say, the stagnation losses on each spoke are reduced if the spoke spacing is reduced, as each spoke follows in the wake of the one before it as the wheel 10 rotates.

The insert 20 can be manufactured in a wide range of materials. As the insert 20 is not required to perform any mechanical function other than redirecting air, material selection is likely to favour those that are cheap and light, for example plastic.

In this embodiment, the insert 20 is carefully designed such that it is as inconspicuous as possible, and therefore not detracting from the aesthetic appeal of the alloy wheel 10.

In another embodiment of the invention, an insert may be formed without the central opening 24, such that the insert entirely fills the cavity 18a between the spokes 16a-16b in the wheel 10. This embodiment will be appropriate for applications where the aesthetic appeal of the insert is less significant. This embodiment may offer the best performance aerodynamically of all of the embodiments of the invention. However there may be a compromise in that air flow through the wheel to cool the brakes behind would be entirely blocked. This embodiment retains the advantage that the insert exhibits handedness, such that separate inserts may be optimised for left-sided and right-sided vehicle wheels. In particular the slope of the blade surface away from the leading edge of each spoke 16a-16e can be retained, even though the insert has no central opening 24, so as to ensure a smooth flow of air past each spoke 16a-16e whilst preserving aesthetic properties of a recess in the outer surface of the insert.

Figure 3:
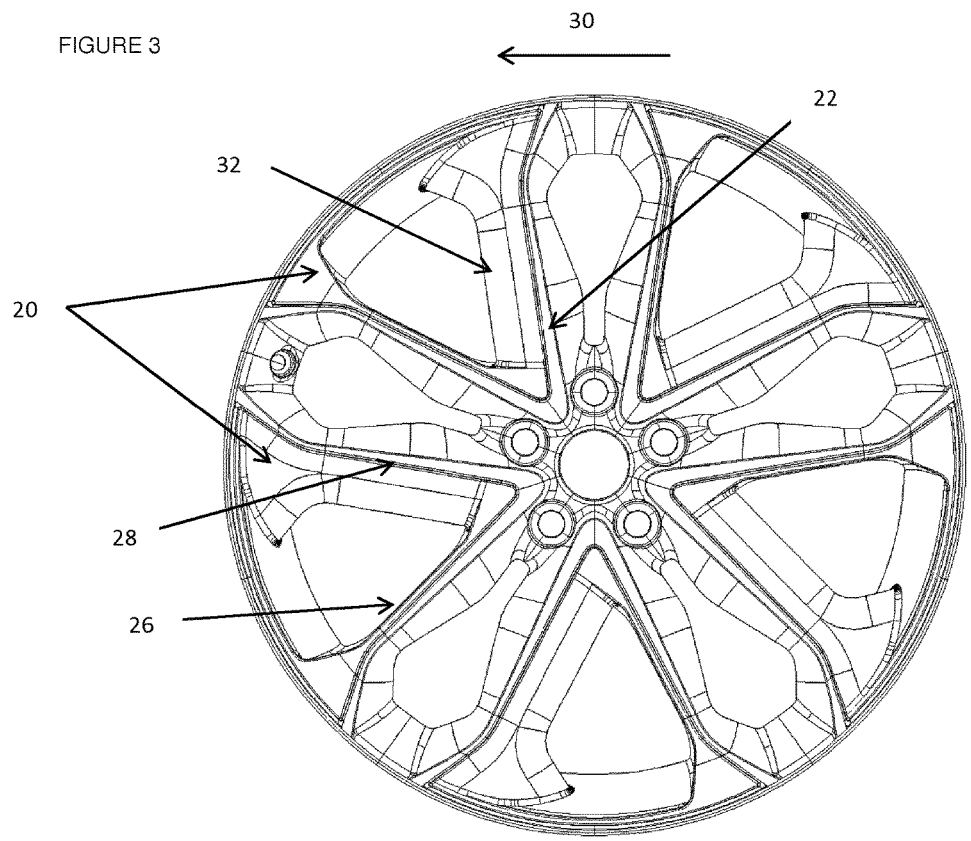
FIG. 3 shows the insert in FIG. 2 when fitted to the vehicle wheel in FIG. 1.
Figure 4:
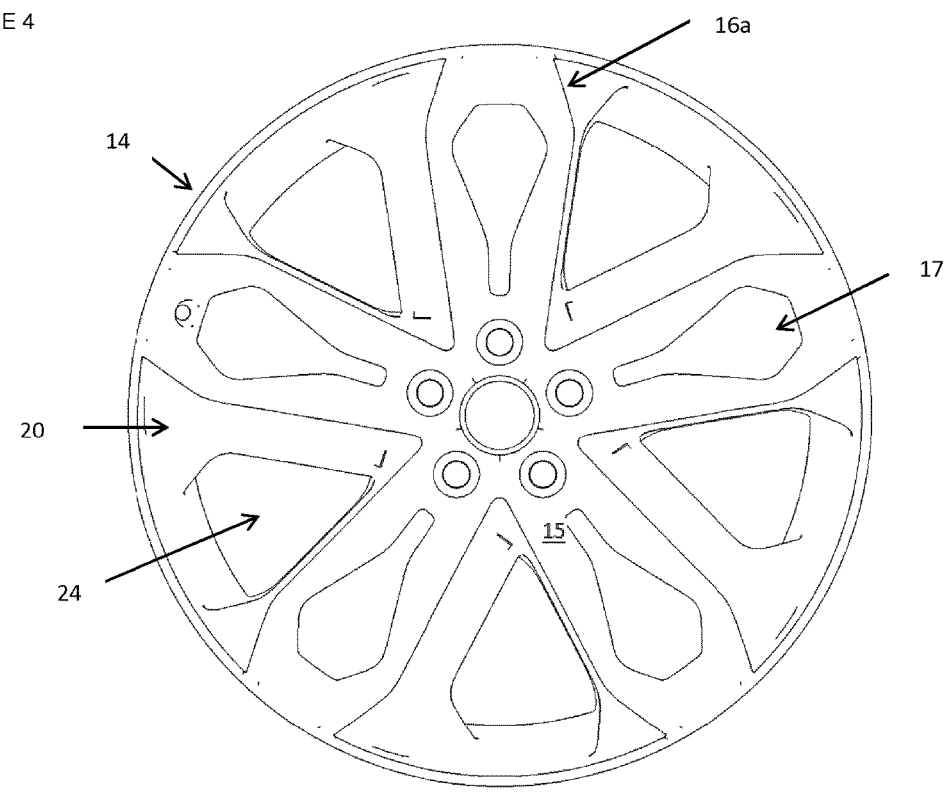
FIG. 4 shows the wheel and insert assembly in FIG. 3, with some contour lines removed for clarity.

In the preferred embodiment of the invention, and as shown in FIG. 3, a separate insert 20 is fitted within each cavity 18a-18e of the wheel. This is more acceptable aesthetically, than forming together multiple inserts as a single part, and also provides the benefit that each insert 20 can be replaced separately to the others should it become damaged or dirty. In another embodiment however, multiple inserts 20 may be formed together as a single part to overmould the alloy wheel 10, with each insert 20 fitting into a corresponding cavity 18a-18e in the wheel 10 but being formed integrally as a single integrated unit with the other inserts. In this embodiment it may be that parts of the overmould stand proud of the outwardly-facing surface 15, rather than the inserts lying flush with said surface 15.

It will be appreciated by a person skilled in the art that the invention could be modified to take many alternative forms to that described herein, without departing from the scope of the invention as set out in the appended claims. For example, any one of the inserts of the invention could be formed from two or more separate pieces. Alternatively, an insert need not fill a whole cavity volume but only a rear or forward portion thereof, depending on the compromise that can be tolerated between aerodynamic benefit and visual appearance.

The invention claimed is:

1. An insert for a wheel of a vehicle, the wheel having a plurality of spokes which define, between adjacent ones of the spokes, a cavity for receiving the insert, wherein the insert is configured to be secured in the cavity, wherein the insert comprises:
   a leading edge and a trailing edge with respective different configurations such that the insert exhibits handedness and is configured for use only on a left-hand or right-hand side of the vehicle,
   and
   wherein the trailing edge comprises an inclined flow redirecting surface that faces incoming air as the vehicle moves forward, wherein the inclined flow redirecting surface takes the form of a blade and extends into the cavity away from a leading edge of an adjacent spoke, and wherein the flow redirecting surface is aerodynamically shaped so as to reduce drag on the leading edge of the adjacent spoke during rotation of the wheel,
   wherein the trailing edge, because of the inclined flow redirecting surface extending into the cavity, has a maximum width that is greater than a maximum width of the leading edge that does not have an inclined flow redirecting surface.

2. The insert of claim 1, wherein the plurality of spokes define, at least in part, an outwardly-facing wheel surface, wherein an outwardly facing surface of each spoke is defined between respective trailing and leading spoke edges, and wherein the flow redirecting surface extends from an edge of an adjacent spoke along substantially an entire length of the edge of the adjacent spoke.

3. The insert of claim 1, wherein the plurality of spokes define, at least in part, an outwardly-facing wheel surface, and wherein, when secured in the cavity, no part of the insert protrudes beyond the outwardly-facing wheel surface.

4. The insert of claim 1, wherein the flow redirecting surface extends inwards towards a vehicle on which the wheel is mounted when the insert is secured in the cavity.

5. The insert of claim 1, wherein the flow redirecting surface is substantially flat.

6. The insert of claim 1, wherein the insert comprises an opening configured to allow airflow therethrough.

7. The insert of claim 1, wherein the insert has an outer profile which is symmetrical about a line extending radially outward from an axis of rotation of the wheel and bisecting the cavity in which the insert is fitted.

8. The insert of claim 1, wherein the insert is configured to be secured in the cavity such that there is no gap between an outer profile of the insert and an outwardly-facing surface of the wheel.

9. The insert of claim 1, wherein the insert comprises plastic.

10. The insert of claim 1, wherein the insert is configured to be removably secured in the cavity.

11. A component for a vehicle wheel, wherein the component comprises at least one insert according to claim 1, and wherein each at least one insert is configured to be secured in a different respective cavity defined between different pairs of adjacent spokes of the wheel.

12. A vehicle wheel fitted with one or more inserts according to claim 1.

13. An insert for a wheel of a vehicle, the wheel having a plurality of spokes which define, between adjacent ones of the spokes, a cavity for receiving the insert, wherein the insert is configured to be secured in the cavity, wherein the insert comprises:

a flow redirecting surface, wherein the flow redirecting surface is formed into a blade and extends into the cavity away from a leading edge of an adjacent spoke, and wherein the flow redirecting surface is aerodynamically shaped so as to reduce drag on the leading edge of the adjacent spoke during rotation of the wheel, wherein the insert comprises an opening configured to allow airflow therethrough, wherein the opening is defined by a leading edge and a trailing edge of the insert, wherein the trailing edge, because of the flow redirecting surface extending into the cavity, has a maximum width that is greater than a maximum width of the leading edge that does not have a flow redirecting surface, and wherein the leading edge and trailing edge have respective different configurations, each with a respective different aerodynamic profile such that the insert exhibits handedness and is configured for use only on a left-hand or right-hand side of the vehicle on which the wheel is mounted.

14. A vehicle wheel fitted with one or more inserts of claim 13.

15. The insert of claim 1 integrally formed with one or more other inserts, wherein each insert fits into a respective cavity of the wheel.

16. The insert of claim 1 formed with one or more other inserts as a single part wherein the single part is configured to overmould the wheel.

* * * * *